Patented Apr. 20, 1937

2,077,529

UNITED STATES PATENT OFFICE 2,077,529

SULPHONE COMPOUNDS

August Modersohn, Cologne-Mulheim, Germany, assignor to General Aniline Works, Inc., New York, N. Y., a corporation of Delaware No Drawing. Application February 24, 1936, Serial No. 65,523. In Germany January 21, 1935

10 Claims. (Cl. 260—109)

The present invention relates to sulphone compounds, more particularly it relates to compounds which may be represented by the following general formula:

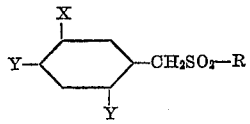

in which X stands for the nitro or amino group, one Y stands for a hydrogen atom and the other Y stands for an alkyl group or a halogen atom, and R stands for the radical of an o-hydroxy carboxylic acid of the benzene series.

My new compounds are obtainable by nitrating in the usual manner compounds of the above general formula, in which X stands for hydrogen and the Y's and R means the same as stated above, and if desired reducing the nitro group to the amino group.

As the nitro group can easily enter the ortho position to a hydroxyl group and, if the ortho positions are occupied, often enters this ortho position by force while expelling another substituent, it could not be foreseen that nitration would proceed in such a manner (compare Borsche and Berkhout A.330.98).

The new compounds thus obtained are generally white to yellowish crystalline substances, insoluble in water, soluble in organic solvents and in aqueous alkalies, and are valuable intermediate products for the manufacture of dyestuffs. Those of my new compounds in which Y of the general formula stands for a halogen atom, easily can be transformed into other valuable intermediate products, for example by substituting the halogen atom by other radicals, as for example the hydroxy group, the amino group, an alkoxy group or a substituted amino group.

The invention is illustrated by the following examples, without being restricted thereto:

*Example 1.*—233 grams of 4-chlorobenzyl-4'-hydroxyphenylsulphone-5'-carboxylic acid, which can be obtained by the condensation of p-chlorobenzyl chloride with salicylic sulphinic acid, are dissolved in 1500 grams of sulphuric acid monohydrate. Into this solution 115 grams of nitrating acid of 39.4% are added by drops at 0° C., and the mixture is stirred for several hours at 20° C. The nitro compound is then separated by pouring the reaction mixture onto ice, filtered off by suction, washed and dried. When recrystallized from glacial acetic acid, the new compound is obtained in white crystals, which melt at 252–253° C. while decomposing. The compound can be probably represented by the formula:

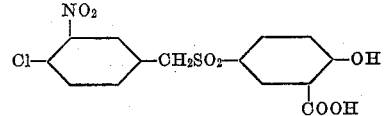

it dissolves in a solution of sodium carbonate and a dilute caustic soda lye with a yellowish coloration and not with the strongly reddish orange coloration characteristic for o-nitro-salicylic acid. When reducing this nitro-chloro compound in the usual manner, the corresponding amino compound is obtained.

In the nitro-chloro compound the halogen atom can be substituted by other groups; for example when heating with methyl alcohol and sodium methylate a new compound free from chlorine is obtained, which can be probably represented by the formula:

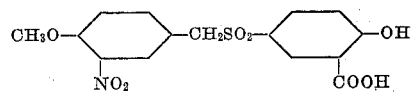

When substituting the 4-chlorobenzyl-4'-hydroxyphenylsulphone-5'-carboxylic acid by the corresponding quantity of 2-chlorobenzyl-4'-hydroxyphenylsulphone - 5' - carboxylic acid (obtained by the condensation of o-chlorobenzyl chloride with salicylic sulphinic acid), there is obtained a nitro compound of similar properties, melting at about 270° C. and yielding, when reduced, an amino compound of the melting point 238° C.

When substituting the 4-chlorobenzyl-4'-hydroxyphenylsulphone-5'-carboxylic acid by the corresponding quantity of 4-methylbenzyl-4'-hydroxyphenylsulphone - 5' - carboxylic acid (obtained by the condensation of p-methylbenzyl chloride with salicylic sulphinic acid), a nitro compound is obtained, which melts at 265° C. while decomposing.

*Example 2.*—330 grams of 2-chlorobenzyl-3'-methyl-4'-hydroxyphenylsulphone - 5' - carboxylic acid, which are obtainable by the condensation of o-chlorobenzyl chloride with o-cresotinic sulphinic acid, are dissolved in 2000 grams of sulphuric acid monohydrate. Into this solution 165 grams of nitrating acid of 39.4% are added by drops at 0° C., then slowly heated to a temperature of about 20° C., the mixture is stirred for several hours at that temperature and then poured onto ice. The nitro product, which separates as a white precipitate, is filtered off with suction, washed and dried. When recrystallized from glacial acetic acid, the new compound melts at 275–276° C. It dissolves in a solution of sodium carbonate and a dilute caustic soda lye with a yellow coloration. When reducing this compound with iron and acetic acid, there is obtained an amino compound of the melting point of 251–252° C., which can be probably represented by the formula:

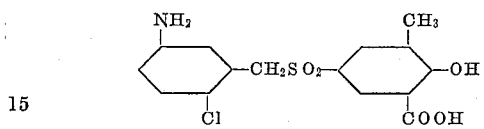

When heating the colorless nitro-2-chlorobenzyl-3'-methyl-4'-hydroxyphenylsulphone-5'-carboxylic acid with concentrated ammonium hydroxide under pressure, there is obtained a yellow nitro-amino compound which slowly decomposes at a temperature of above 260° C. This formation of a nitro-amino compound can only be explained in the manner that the nitro group has entered while nitrating the para position to the chlorine atom, as entering the ortho position is not very probable. Therefore the compound probably has the following constitution:

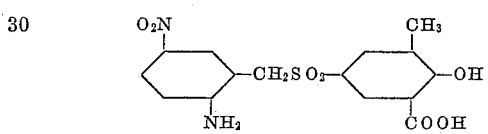

When substituting in the above example the 2-chlorobenzyl - 3' - methyl - 4'-hydroxyphenylsulphone-5'-carboxylic acid by the corresponding quantity of 4-chlorobenzyl-3'-methyl-4'-hydroxyphenylsulphone-5'-carboxylic acid and proceeding for the rest as indicated above, there is obtained a nitro compound of similar properties, which yields after reduction an amino compound of the melting point 242° C. when substituting the same by 2-chlorobenzyl-2'-hydroxy-5'-methylphenylsulphone-3'-carboxylic acid, a nitro compound of the melting point 208° C. is obtained.

I claim:

1. In the process of preparing amino-sulphone compounds, the step which comprises nitrating a compound of the general formula:

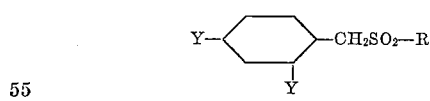

wherein one y stands for a hydrogen atom and the other y stands for a substituent selected from the group consisting of halogen and alkyl, and R stands for the radical of an ortho-hydroxy carboxylic acid of the benzene series.

2. The process which comprises nitrating a compound of the general formula:

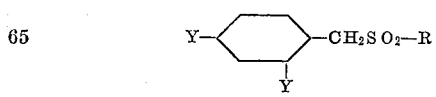

wherein one Y stands for a hydrogen atom and the other Y stands for a substituent selected from the group consisting of halogen and alkyl, and R stands for the radical of an o-hydroxy carboxylic acid of the benzene series, and reducing the nitro compound obtained to the amino compound.

3. In the process of preparing amino-sulphone compounds, the step which comprises nitrating a compound of the general formula:

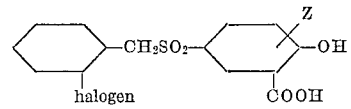

wherein Z stands for a member selected from the group consisting of hydrogen and an alkyl group.

4. The process which comprises nitrating a compound of the general formula:

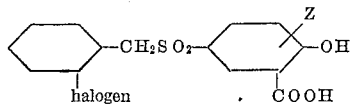

wherein Z stands for a member selected from the group consisting of hydrogen and alkyl, and reducing the nitro compound obtained to the amino compound.

5. In the process of preparing amino-sulphone compounds, the step which comprises nitrating the compound of the formula:

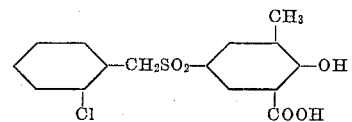

6. The process which comprises nitrating the compound of the formula:

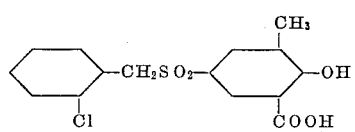

and reducing the nitro compound to the amino compound.

7. The compounds of the general formula:

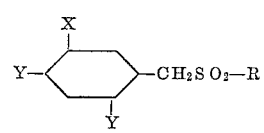

wherein X stands for a substituent selected from the group consisting of the nitro group and the amino group, one Y stands for a hydrogen atom, the other Y stands for a substituent selected from the group consisting of halogen and alkyl, and R stands for the radical of an o-hydroxycarboxylic acid of the benzene series, being generally white to yellow crystalline substances insoluble in water, soluble in aqueous alkalies and organic solvents, and being valuable intermediates for the manufacture of dyestuffs.

8. The compounds of the general formula:

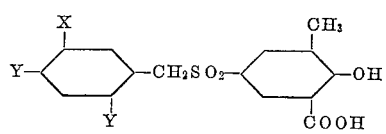

wherein X stands for a substituent selected from the group consisting of the nitro group and the amino group, one Y stands for a hydrogen atom, the other Y stands for a chlorine atom, being generally white to yellow crystalline substances insoluble in water, soluble in aqueous alkalies and organic solvents, and being valuable intermediates for the manufacture of dyestuffs.

9. The compound of the following formula:

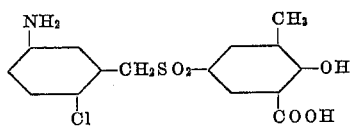

being a white compound of the melting point 251–252° C. and being a valuable substance for the manufacture of dyestuffs.

10. The compound of the following formula:

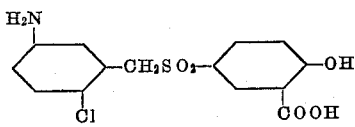

being a white crystalline compound of the melting point 238° C. and being a valuable substance for the manufacture of dyestuffs.

AUGUST MODERSOHN.